United States Patent
Pratt

(10) Patent No.: US 10,348,711 B2
(45) Date of Patent: *Jul. 9, 2019

(54) RESTRICTING NETWORK ACCESS TO UNTRUSTED VIRTUAL MACHINES

(71) Applicant: Bromium, Inc., Cupertino, CA (US)

(72) Inventor: Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/200,989

(22) Filed: Jul. 1, 2016

(65) Prior Publication Data

US 2017/0201507 A1 Jul. 13, 2017

Related U.S. Application Data

(63) Continuation of application No. 14/316,629, filed on Jun. 26, 2014, now Pat. No. 9,386,021, which is a (Continued)

(51) Int. Cl.
*H04L 29/06* (2006.01)
*G06F 9/455* (2018.01)
*G06F 9/50* (2006.01)

(52) U.S. Cl.
CPC .......... *H04L 63/08* (2013.01); *G06F 9/45545* (2013.01); *G06F 9/45558* (2013.01);
(Continued)

(58) Field of Classification Search
None
See application file for complete search history.

(56) References Cited

U.S. PATENT DOCUMENTS 6,789,156 B1 9/2004 Waldspurger
6,948,044 B1 9/2005 Chandrasekaran
(Continued)

FOREIGN PATENT DOCUMENTS

WO 2008073618 A2 6/2008

OTHER PUBLICATIONS

Schmidt, Matthias, et al. "Trustbox: A Security Architecture for Preventing Data Breaches." Parallel, Distributed and Network-Based Processing (PDP), 2011, 5 pgs., 19th Euromicro International Conference on. IEEE, 2011.
(Continued)

*Primary Examiner* — Matthew J Brophy
(74) *Attorney, Agent, or Firm* — Brokaw Patent Law PC; Christopher J. Brokaw

(57) ABSTRACT

Approaches for providing operating environments selective access to network resources. A guest operating system, executing on a device, may issue a request to a network device for access to a set of network resources. Once the guest operating system authenticates itself to the network device, the network device provides, to the guest operating system, access to the set of network resources. Note that the host operating system, executing on the device, does not have access to the set of network resources. A guest operating system may be provided access to an untrusted network in a manner that denies the host operating system access to the untrusted network. In this way, any malicious code inadvertently introduced into the host operating system cannot access the untrusted network for unscrupulous purposes.

20 Claims, 8 Drawing Sheets

Related U.S. Application Data continuation-in-part of application No. 13/115,354, filed on May 25, 2011, now Pat. No. 8,972,980.

(60) Provisional application No. 61/349,717, filed on May 28, 2010.

(52) U.S. Cl.
CPC ............ *G06F 9/5077* (2013.01); *H04L 63/10* (2013.01); *G06F 2009/45562* (2013.01); *G06F 2009/45587* (2013.01); *G06F 2009/45595* (2013.01); *H04L 63/0209* (2013.01)

(56) References Cited

U.S. PATENT DOCUMENTS

| | | | |
|---|---|---|---|
| 7,171,523 B2 | 1/2007 | Yamasaki | |
| 7,506,265 B1 | 3/2009 | Traut et al. | |
| 7,552,419 B2* | 6/2009 | Zimmer | G06F 21/53 717/121 |
| 7,865,908 B2* | 1/2011 | Garg | G06F 9/45537 718/1 |
| 7,971,047 B1 | 6/2011 | Vlaovic et al. | |
| 8,146,084 B1 | 3/2012 | Meketa | |
| 8,151,263 B1 | 4/2012 | Venkitachalam et al. | |
| 8,171,141 B1 | 5/2012 | Offer et al. | |
| 8,219,987 B1 | 7/2012 | Vlaovic et al. | |
| 8,346,727 B1 | 1/2013 | Chester et al. | |
| 8,347,263 B1 | 1/2013 | Offer | |
| 8,407,438 B1 | 3/2013 | Ranade | |
| 8,543,641 B2 | 9/2013 | Cherukuri et al. | |
| 8,555,380 B2* | 10/2013 | Shanbhogue | G06F 9/4484 726/22 |
| 8,601,583 B1 | 12/2013 | Chandrasekhar et al. | |
| 8,656,482 B1* | 2/2014 | Tosa | H04L 63/08 713/153 |
| 8,813,223 B2* | 8/2014 | Chakrabarti | H04L 63/02 726/22 |
| 8,910,238 B2* | 12/2014 | Lukacs | G06F 21/53 713/164 |
| 9,143,530 B2* | 9/2015 | Qureshi | G06F 21/10 |
| 2004/0128670 A1 | 7/2004 | Robinson et al. | |
| 2005/0149726 A1 | 7/2005 | Joshi et al. | |
| 2006/0101189 A1 | 5/2006 | Chandrasekaran et al. | |
| 2006/0112342 A1* | 5/2006 | Bantz | G06F 21/50 715/736 |
| 2006/0136910 A1 | 6/2006 | Brickell et al. | |
| 2006/0143617 A1 | 6/2006 | Knauerhase et al. | |
| 2006/0184937 A1 | 8/2006 | Abels et al. | |
| 2006/0288343 A1 | 12/2006 | Pallister | |
| 2007/0094396 A1* | 4/2007 | Takano | H04L 67/1008 709/226 |
| 2007/0180450 A1 | 8/2007 | Croft et al. | |
| 2007/0192329 A1 | 8/2007 | Croft et al. | |
| 2007/0198656 A1 | 8/2007 | Mazzaferri et al. | |
| 2007/0250833 A1 | 10/2007 | Araujo et al. | |
| 2008/0001958 A1 | 1/2008 | Vembu et al. | |
| 2008/0059556 A1 | 3/2008 | Greenspan et al. | |
| 2008/0104315 A1* | 5/2008 | Hall | G06F 3/0613 711/112 |
| 2008/0244579 A1 | 10/2008 | Muller | |
| 2008/0271017 A1 | 10/2008 | Herington | |
| 2009/0007242 A1 | 1/2009 | Subramanian et al. | |
| 2009/0119541 A1 | 5/2009 | Inoue et al. | |
| 2009/0125902 A1 | 5/2009 | Ghosh et al. | |
| 2009/0165133 A1 | 6/2009 | Hwang et al. | |
| 2009/0172660 A1 | 7/2009 | Klotz, Jr. et al. | |
| 2009/0172820 A1 | 7/2009 | Watson | |
| 2009/0204964 A1* | 8/2009 | Foley | G06F 21/53 718/1 |
| 2009/0249472 A1 | 10/2009 | Litvin et al. | |
| 2009/0260007 A1 | 10/2009 | Beaty et al. | |
| 2009/0276783 A1 | 11/2009 | Johnson et al. | |
| 2009/0300599 A1 | 12/2009 | Piotrowski | |
| 2009/0313620 A1 | 12/2009 | Sedukhin et al. | |
| 2009/0328033 A1 | 12/2009 | Kohavi et al. | |
| 2010/0031325 A1* | 2/2010 | Maigne | G06F 9/45533 726/4 |
| 2010/0049968 A1* | 2/2010 | Dimitrakos | H04L 63/0807 713/153 |
| 2010/0057898 A1* | 3/2010 | Imai | G06F 9/5072 709/223 |
| 2010/0070725 A1* | 3/2010 | Prahlad | G06F 11/1453 711/162 |
| 2010/0122343 A1 | 5/2010 | Ghosh et al. | |
| 2010/0235831 A1 | 9/2010 | Dittmer | |
| 2010/0257523 A1 | 10/2010 | Frank | |
| 2010/0299667 A1 | 11/2010 | Ahmad et al. | |
| 2011/0022694 A1 | 1/2011 | Dalal et al. | |
| 2011/0023028 A1 | 1/2011 | Nandagopal et al. | |
| 2011/0035494 A1 | 2/2011 | Pandey et al. | |
| 2011/0173251 A1 | 7/2011 | Sandhu et al. | |
| 2011/0209140 A1 | 8/2011 | Scheidel et al. | |
| 2011/0258621 A1 | 10/2011 | Kern | |
| 2011/0296412 A1* | 12/2011 | Banga | G06F 9/5027 718/1 |
| 2011/0296487 A1 | 12/2011 | Walsh | |
| 2011/0302577 A1 | 12/2011 | Reuther et al. | |
| 2012/0005672 A1 | 1/2012 | Cervantes et al. | |
| 2012/0089666 A1 | 4/2012 | Goswami et al. | |
| 2012/0089980 A1 | 4/2012 | Sharp et al. | |
| 2012/0110155 A1* | 5/2012 | Adlung | G06F 9/5077 709/223 |
| 2012/0110164 A1* | 5/2012 | Frey | G06F 9/5077 709/224 |
| 2012/0110588 A1* | 5/2012 | Bieswanger | G06F 8/65 718/104 |
| 2012/0137117 A1* | 5/2012 | Bosch | G06F 21/53 713/2 |
| 2012/0254860 A1 | 10/2012 | Bozek et al. | |
| 2012/0260250 A1 | 10/2012 | Maeda et al. | |
| 2012/0297383 A1 | 11/2012 | Meisner et al. | |
| 2013/0179894 A1* | 7/2013 | Calder | G06F 9/5027 718/104 |
| 2013/0219387 A1* | 8/2013 | Moeller | G06F 9/4401 718/1 |
| 2013/0283266 A1 | 10/2013 | Baset et al. | |
| 2013/0332924 A1* | 12/2013 | Shaposhnik | G06F 21/57 718/1 |
| 2013/0346987 A1* | 12/2013 | Raney | G06F 9/5044 718/102 |
| 2014/0007222 A1* | 1/2014 | Qureshi | G06F 21/10 726/16 |
| 2014/0115580 A1* | 4/2014 | Kellerman | G06F 9/455 718/1 |
| 2014/0115623 A1* | 4/2014 | Rajgopal | H04N 21/835 725/25 |
| 2014/0115646 A1* | 4/2014 | Rajgopal | H04N 21/4622 725/110 |
| 2014/0351810 A1 | 11/2014 | Pratt et al. | |
| 2015/0033227 A1* | 1/2015 | Lin | G06F 21/55 718/1 |

OTHER PUBLICATIONS

Xia, Mingyuan, et al. "Enhanced Privilege Separation for Commodity Software on Virtualized Platform." Parallel and Distributed Systems (ICPADS), 2010 IEEE 16th International Conference on. IEEE, 2010.

Garfinkel, Tal, et al. "Terra: A Virtual Machine-Based Platform for Trusted Computing." ACM SIGOPS Operating Systems Review. vol. 37. No. 5. ACM, 2003.

James, Peter, "Preventing the Acquisition of Data from Virtual Machine based Secure Portable Execution Environments," Proceedings of the 6th Australian Digital Forensics Conference, Edith Cowan University, Perth Western Australia, Dec. 3, 2008, 16 pages.

Hyde, Doug, "A Survey on the Security of Virtual Machines," web

(56) References Cited

OTHER PUBLICATIONS page available at http://www.cse.wustl.edu/~jain/cse571-09/index.html, last modified Apr. 21, 2009, printed Mar. 14, 2018, 11 pages.

* cited by examiner

US 10,348,711 B2

RESTRICTING NETWORK ACCESS TO UNTRUSTED VIRTUAL MACHINES

RELATED APPLICATION DATA

This application is a continuation of, and claims priority to, U.S. patent application Ser. No. 14/316,629, filed on Jun. 26, 2014, entitled "Restricting Network Access to Untrusted Virtual Machines," invented by Ian Pratt, the disclosure of which is hereby incorporated by reference in its entirety for all purposes as if fully set forth herein.

Parent patent application Ser. No. 14/316,629 is a continuation-in-part of, and claims priority to, U.S. patent application Ser. No. 13/115,354, filed on May 25, 2011, having a priority date of May 28, 2010, entitled "Approaches for Securing an Internet Endpoint Using Fine-Grained Operating System Virtualization," invented by Gaurav Banga et al., the disclosure of which is hereby incorporated by reference in its entirety for all purposes as if fully set forth herein.

FIELD OF THE INVENTION

Embodiments of the invention relate to restricting network access to certain virtual machines dedicated to performing operations on untrustworthy data.

BACKGROUND

Many locations, such as coffee shops, libraries, and businesses, offer the public access to wireless networks. Such access may be complimentary or available for a fee. Public computer networks are common targets for infection by malicious code. Any computer which joins an infected public network may itself become targeted and infected by malicious code residing on the network.

Presently, there are a variety of techniques for scanning digital files transferred to a computer to determine whether any portion of the digital file matches a signature associated with a known virus or malicious code. Once identified, such dangerous files are quarantined and appropriate security measures taken. Unfortunately, due to an increase in exploitation of file format vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1A:
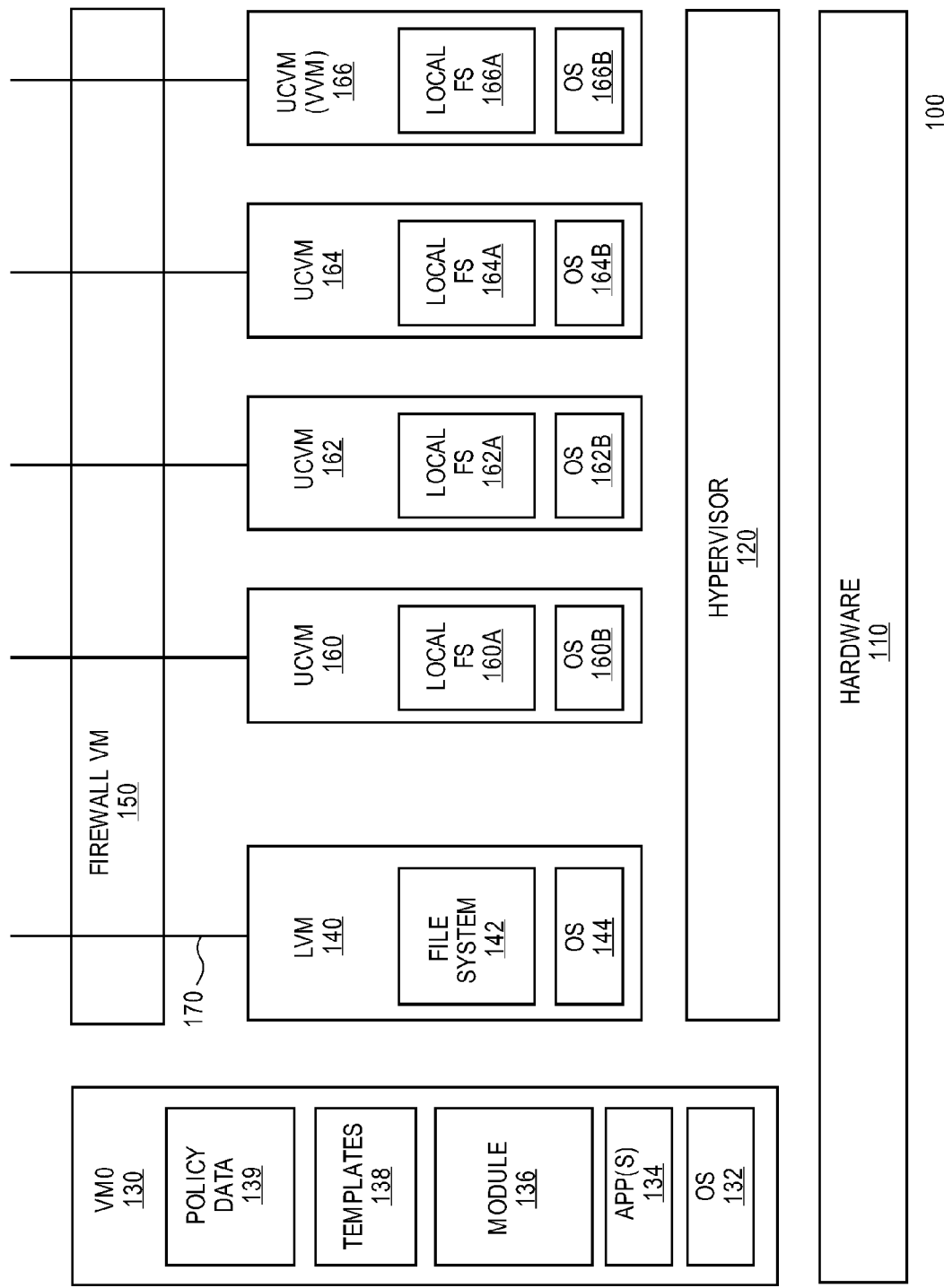
FIG. 1A is an block diagram of the functional components of one embodiment of the invention.

Approaches for providing operating environments selective access to network resources are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Approaches will be discussed that enable one or more guest operating systems executing on a single device to have access to one or more untrusted network resources, while preventing a host operating system executing on the same device as the guest operating systems from having access to the one or more untrusted network resources. These approaches promote a secure operating environment because any malicious code inadvertently introduced into the host operating system cannot access an untrusted network for unscrupulous purposes. In this way, the privacy of the resources of the host operating system may be ensured.

According to one illustrative embodiment of the invention, a guest operating system, executing on a device, issues a request to a network device for access to a set of network resources. The request contains data which allows the guest operating system to authenticate itself to the network device. Once the guest operating system authenticates itself to the network device, the network device provides, to the guest operating system, access to the set of network resources.

Note that the host operating system, executing on the device, does not have access to the set of network resources. Further, the host operating system does not have access to any information necessary to authenticate itself to the network device, and so it is not possible for any malicious code, inadvertently introduced into the host operating system, to gain the ability to successfully request and subsequently receive, from the network device, access to any network resources.

Various embodiments of the invention may employ different techniques for authenticating the guest operating system to the network device. For example, the guest operating system may authenticate itself using a secret, and that secret may be stored either in the guest operating system itself or within a hypervisor. As another example of the variances between embodiments, how the data used to authenticate a guest operating system is formed and conveyed to the network device may vary from embodiment to embodiment.

Additional details about how operating environments may be provided selective access to network resources are discussed below, particularly in the section entitled "Restricting Network Access to a Guest Operating System." However, prior to discussing this topic, additional information about the operating environments in which certain embodiments may be practiced will be presented.

Illustrative Operating Environments

Embodiments of the invention may be employed on a client. A block diagram of client 100 according to one embodiment of the invention is shown in FIG. 1A. The term "client," as broadly used herein, represents any type of Internet endpoint, computer system, and/or device capable of connecting to a network and executing a virtual machine. Non-limiting, illustrative examples of client 100 include a PC, a laptop computer, a tablet computer, a cell phone, a personal digital assistant (PDA), and the like.

In an embodiment, client 100 may be embodied as a physical device which is acts as a server. Thus, while use of the term "client" in other contexts might exclude an interpretation that includes a server, as broadly used herein, client 100 may be embodied on a wide variety of machines, one example of such being a server. Thus, as the Applicant may be his or her own lexicographer, as used herein, the term client 100 expressly includes a device acting as a server. For example, non-limiting, illustrative examples of client 100 include a web server, an application server, a file server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

In an embodiment, client 100 includes a number of virtual machine that execute on hardware 110 of client 100. A description of a client that executes a virtual machine may be found in one or more of U.S. patent application Ser. Nos. 13/115,354, 13/419,345, and 13/667,750, the disclosures of which are hereby incorporated by reference for all purposes as if fully set forth herein.

The various VMs executing on client 100 may be used for separately executing processes associated with different activities. One such VM, namely "VM0" (i.e., VM0 130 of FIG. 1A), is secured so that VM0 may serve as the root of trust with a guaranteed integrity. VM0 may contain core operating system 132 and one or more applications 134. In the embodiment shown in FIG. 1A, VM0 is not accessible over any network, such as the Internet. As shall be explained below, VM0 provides a secure environment in which operating system 132 and one or more applications 134 may execute without risk of exposure to malicious code.

Other VMs, such as VMs 160, 162, 164, and 166 in FIG. 1A, may be created, maintained, and destroyed on-demand using a very efficient micro-virtualizing hypervisor 120. Using efficient micro-virtualization techniques, the latency of starting and stopping activities or applications which run in their own VM in embodiments is very low, thereby providing a practical user experience while employing full OS virtualization.

In an embodiment of the invention, a special virtual machine, referred to herein as "VM0," is created to be a trusted and secure portion of a computer system. FIG. 1A depicts VM0 130 according to an embodiment. VM0 130 may be (but need not be) permanently disconnected from any network (i.e., VM0 130 is not connected to any local network or the Internet). Specifically, VM0 130 may not contain any type of networking stack, such as a TCP/IP network stack, and may not have access to any networking hardware that could allow for communication between VM0 130 or any applications 134 executed thereby and the Internet. Thus, in an embodiment, the only way to install software onto VM0 130 is to have physical custody of client 100 and manually install the software on VM0 130.

Note that in certain embodiments, VM0 130 may be implemented to execute on native hardware. In such an embodiment, VM0 130 would not be considered a virtual machine. Thus, while examples are discussed herein where VM0 130 is implemented as a virtual machine, other embodiments of the invention may embody VM0 130 not as a virtual machine, but instead, may execute VM0 130 on native hardware.

In certain embodiments, one or more applications 134 executing within VM0 130 do not have any access to a network, must be fully self-contained in their functionality, and must rely only on local code and data for all their functionality. All applications that need to access the network will therefore need to run in a separate virtual machine outside of VM0 130, as shall be described in further detail below. It is envisioned that the software (such as one or more applications 134) running in VM0 130 be selected at the time client 100 is manufactured or first configured for use in a controlled environment. If VM0 130 is never connected to any type of network, such as a TCP/IP network, all common types of network initiated attacks cannot be waged against VM0 130, thereby rendering VM0 130 immune to such attacks and safe as compared to any computer or VM that is connected to the Internet.

Hypervisor 120 is a software component that is responsible for creating other VMs which each execute independent instances of an operating system. Hypervisor 120 may correspond to either a Type 1 or Type 2 hypervisor. In an embodiment where hypervisor 120 is a Type 2 hypervisor, when client 100 is booted, only VM0 130 is started by the BIOS or firmware of client 100. Once VM0 130 is running, VM0 130 can start hypervisor 120 immediately or on demand. In another embodiment, where hypervisor 120 is a Type 1 hypervisor, hypervisor 120 is first started by the BIOS when client 100 is booted and VM0 130 is launched by hypervisor 120.

Virtual machines instantiated by hypervisor 120 may be used to access untrusted network resources or perform any task which could introduce untrusted code into client 100. Untrusted code in this context is any code which has not been pre-approved as being trusted by an IT administrator of client 100. Note that the user's desktop may, but need not, run in VM0 130. If the user's desktop is not run within VM0 130, then it could be run within another VM, such as one specifically tailored to that task. The additional VMs are started "silently" and automatically by client 100, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 100. Embodiments of the invention follow rules that govern what application activities are assigned to which particular VM. Additional examples of such rules are described below in greater detail.

In another embodiment (not depicted in FIG. 1A), VM0 130 may have a networking stack that is firewalled off from the network using well-tested firewall software, thereby allowing VM0 130 to have access to a computer network. Such an embodiment may only allow connections with a specific Internet system so that the software inside VM0 130 may be updated from a designated update server. For example, the firewall software may only allow VM0 130 to connect to one or more servers associated with the IT administrator of client 100 and may prevent VM0 130 from establishing a connection with any other endpoint on any network.

Type 1.5 Hypervisors

In an embodiment, hypervisor 120 may be embodied as a Type 2 hypervisor which executes at a greater privilege than host operating system 160 (this special form of a Type 2 hypervisor shall be referred to herein as a "Type 1.5 hypervisor").

Figure 1B:
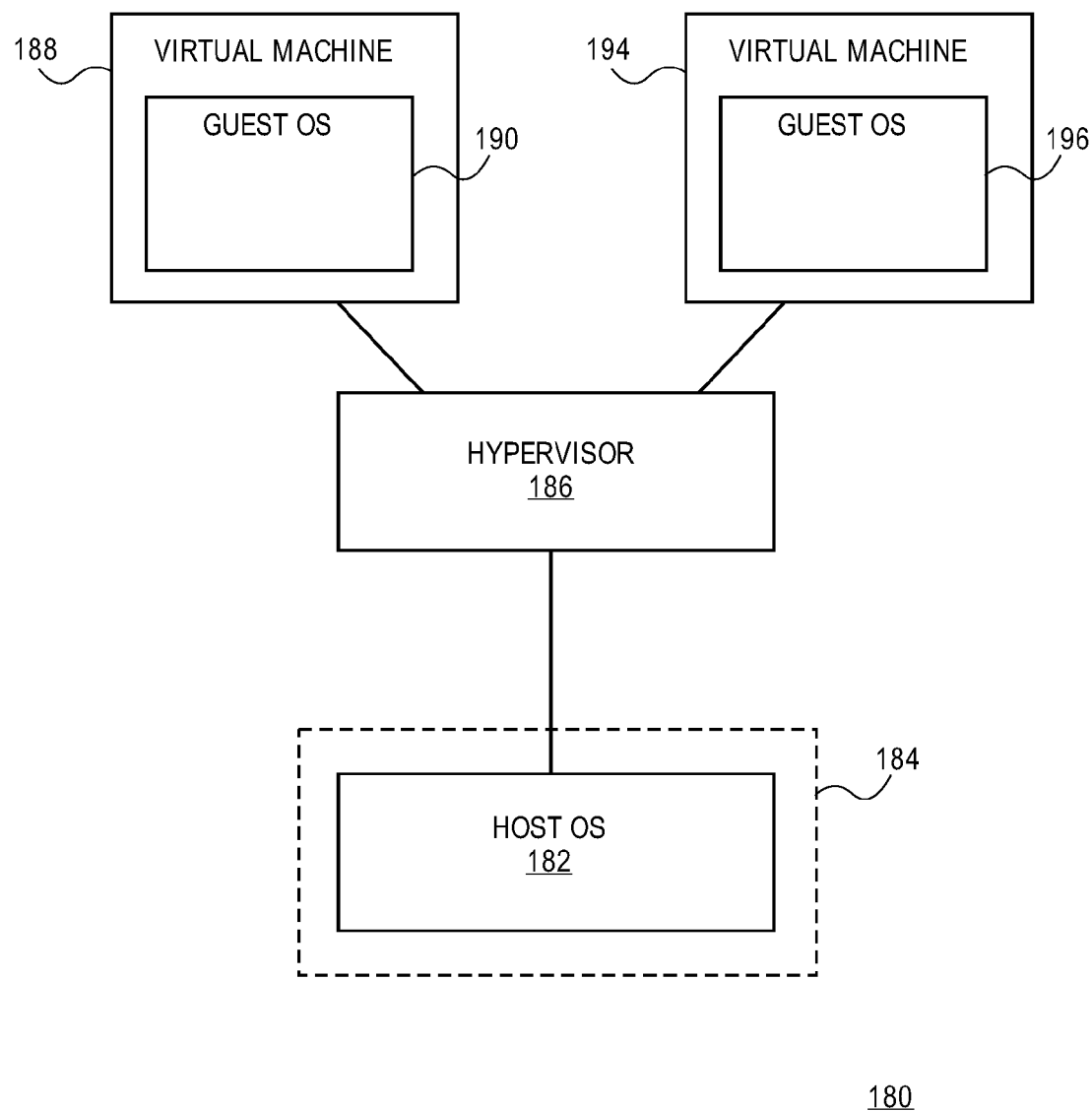
FIG. 1B is a block diagram illustrating a Type 1.5 hypervisor which may be used by an embodiment of the invention.

The operation of a Type 1.5 hypervisor according to an embodiment shall be described in further detail below with reference to FIG. 1B. FIG. 1B is a block diagram illustrating an exemplary system 180 according to an embodiment of the invention. System 180 includes a set of software components, namely host operating system 182 (hereafter "host OS 182"), hypervisor 186, and virtual machines 188 and 194. The software components of system 180 may reside and operate on a wide variety of physical devices. For example, non-limiting, illustrative examples of the types of physical devices which may be included in system 180 include a personal computer (PC), a tablet PC, a laptop computer, a cell phone, a personal digital assistance (PDA), and the like.

Host OS 182 is intended to broadly represent any type of operating system which is capable of managing a set of resources. Hypervisor 186 is intended to broadly represent any type of hypervisor that executes within host OS 182. Hypervisors that execute within a host operating system may be referred to as Type 2 hypervisors; although, as shall be evident from the present teachings, hypervisor 186 of an embodiment operates differently than Type 2 hypervisors known in the art.

Hypervisor 186 is capable of creating and managing a plurality of different virtual machines (conventionally termed "guest operating systems") using the memory and other resources available to hypervisor 186. Guest operating systems within system 180 are intended to execute within a virtual machine. FIG. 1B depicts guest operating systems (hereafter simply guest OS) 190 and 196 which execute within virtual machines 188 and 194 respectively.

While FIG. 1B only depicts two virtual machines, it will be evident to those in the art that hypervisor 186 may create any number of virtual machines. Furthermore, hypervisor 186 may, at various times, de-allocate a particular virtual machine when it is no longer needed. Therefore, the number of virtual machines, and by extension the number of guest operating systems, within system 180 may vary over time and from implementation to implementation.

Resources, such as memory, access to the CPU, and access to an I/O device, may be assigned or allocated to hypervisor 186. Hypervisor 186, in turn, may allocate a certain portion of these resources to a virtual machine instantiated by hypervisor 186.

In an embodiment, to prevent host OS 182 from accessing resources belonging to or allocated by hypervisor 186, execution of host OS 182 is transferred into virtual machine container 184. Virtual machine container 184, as broadly used herein, refers to any container, abstraction, or mechanism which may be used to enforce and manage access to a bounded area of memory. For example, virtual machine container 184 may be implemented as a VMCS container provided by certain Intel® hardware by an embodiment. Virtual machine container 184 is designed or configured to have insufficient privilege to access any portion of the set of memory pages in which hypervisor 186, or any virtual machine instantiated thereby, reside. Therefore, processes executing within virtual machine container 184 cannot access resources assigned to or allocated by hypervisor 186, but for certain exceptions discussed below.

Embodiments may employ different mechanisms to ensure that virtual machine container 184 lacks sufficient privilege to access resources allocated to or by hypervisor 186. One way for doing so is by removing reference to the set of memory pages in which hypervisor 186 resides from the Extended Page Tables (EPT) of host OS 182. Extended Page Tables are tables used by a Memory Management Unit (MMU) to map guest-physical addresses to host-physical addresses. Thus, in an embodiment, the Extended Page Tables of virtual machine container 184 allows host OS 182 to access the memory and other resources host OS 182 is supposed to possess, but not the memory and other resources belonging to or allocated by hypervisor 186. Hardware components, such as a MMU, may establish and enforce constraints on what portions of memory host OS 182 is allowed to access based on data within the Extended Page Tables.

Embodiments may take different approaches for establishing host OS 182 within virtual machine container 184. For example, in one embodiment, initially, host OS 182 boots. Thereafter, after booting host OS 182, host OS 182 is transferred into a virtual machine container 184 as they hypervisor starts. In a different approach, prior to booting host OS 182, a portion of machine memory is reserved such that the host OS 182 will not use it. Thereafter, the full hypervisor 186 is instantiated within the reserved portion of memory which host OS 182 cannot access.

In an embodiment, once host OS 182 is prevented from accessing any resources belonging to or allocated by hypervisor 186, devices under the control of host OS 182 are prevented from performing unauthorized direct memory accesses (DMA) to resources belonging to or allocated by hypervisor 186 by means of configuring the input/output memory management unit (IOMMU). Thus, the host OS 182 is responsible for allocating resources to the hypervisor 186, but having allocated such resources the hypervisor 186 configures the hardware to removes the host OS's ability to access such resources (thus ensuring the privacy and integrity of the hypervisor and any VMs the hypervisor goes on to assign those resources to). However, that is not to say that host OS 182, or devices under control of host OS 182, can never access the resources belonging to or allocated by 182 to perform certain activity, such as I/O operations, on behalf of hypervisor 186 and virtual machines 188 and 194.

To balance the need to have host OS 182 perform I/O operations for hypervisor 186 while minimizing the scope of access afforded to host OS 182, in embodiments of the invention, hypervisor 186 may provide host 182 temporary access to those memory pages involved in the performance of an operation (such as an I/O operation). Thereafter, hypervisor 186 may revoke access to those memory pages from host OS 182, presumably once the I/O operation has been performed. In this way, host OS 182 only has access to those memory pages necessary to perform the operations it has been requested to perform by hypervisor 186 or virtual machines 188 and 194.

To illustrate a concrete example, hypervisor 186 or virtual machines 188 and 194 may provide host OS 182 temporary access to a set of memory pages by granting a token to host OS 182. Thus, when host OS 182 performs an I/O operation it can present the token to the hypervisor 186 to facilitate the reading from or writing to the location of memory identified by the token as required by the requested operation.

Rather than providing a memory address to hypervisor 186 to identify a set of memory pages at which a requested operation is to be performed, host OS 182 need only provide a token. When host OS 182 wishes to read or write to a set of memory pages allocated to hypervisor 186, host OS 182 notifies hypervisor 186 that host OS 182 desires that a particular operation be performed against a set of memory pages and provides a token for those memory pages to hypervisor 186. If the token is valid, then hypervisor 186 will permit the read or write operation to the set of memory pages identified by the token. Hypervisor 186 will subsequently revoke the temporary permission to write to that location in memory from host OS 182 by causing the token to become invalid. If the token is invalid, then hypervisor 186 will not permit the operation to be performed by host OS 182.

Additional details about Type 1.5 hypervisors may be found in U.S. patent application Ser. No. 14/140,438, filed Dec. 24, 2013, entitled "A Hypervisor Managing Memory Addressed Above Four Gigabytes," incorporated herein by reference for all purposes as if fully set forth herein.

Interaction with a User Interface

All code responsible for generating a user interface (UI) not associated with an application may be maintained in VM0 130. Consequently, all UI interaction activity with the desktop between a user and software executing on client 100 may take place between the user and VM0 130, which maintains a unified desktop for all applications running in all VMs. Interaction between the user and applications running in VMs other than VM0 130 takes place indirectly via VM0 130. For example, when the user enters a password for a web site whose browser and HTML/Javascript code is running in an untrusted VM, the password is first directly provided to VM0 130, which then transfers the information to an untrusted VM responsible for interacting with the web site. Furthermore, the untrusted VM's display is rendered on to a virtualized display, which is then composed into the VM0 130 desktop (as appropriate) by controlling code running in VM0 130. As code executing in VM0 130 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 2:
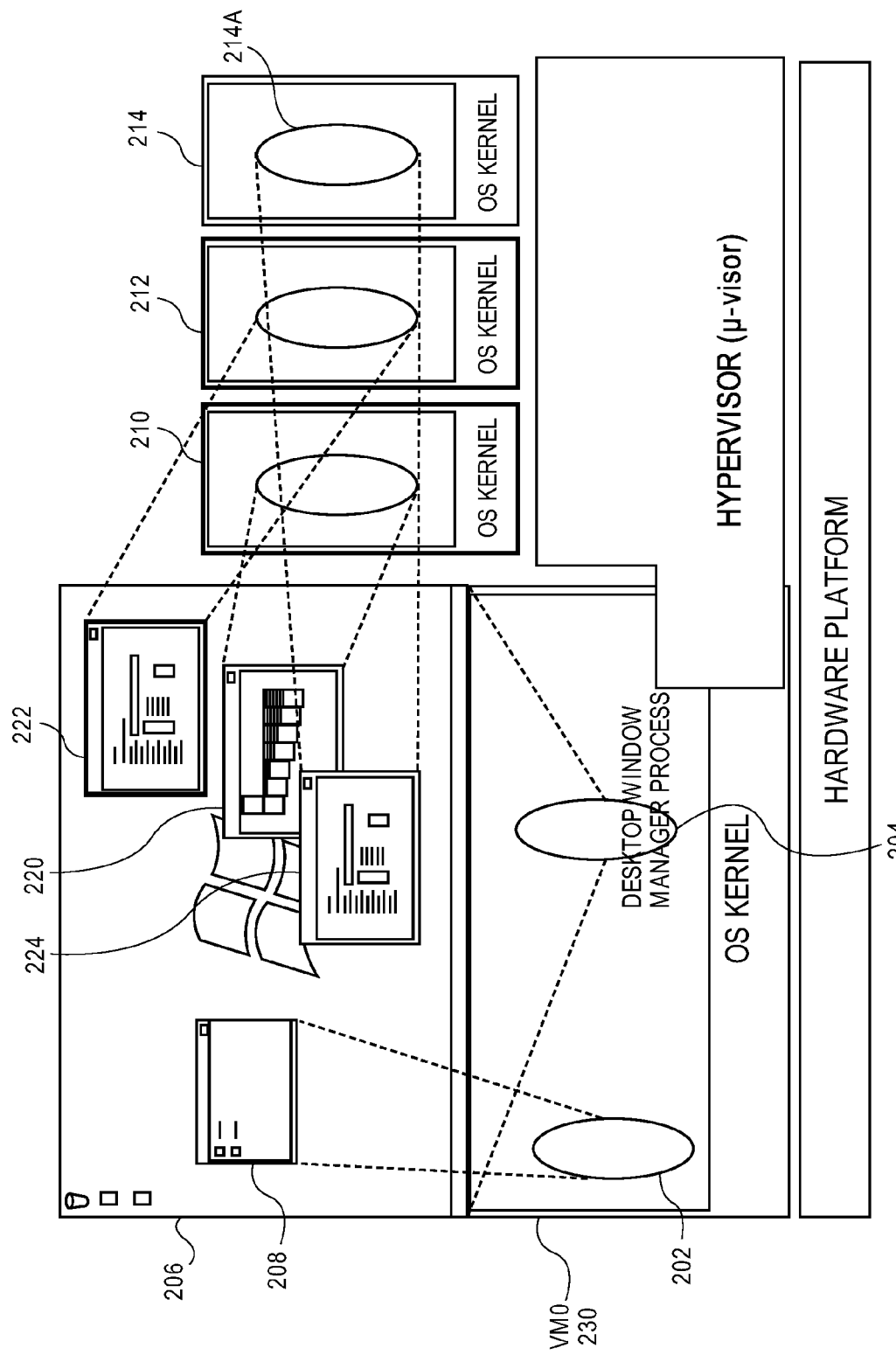
FIG. 2 is an illustration of exemplary desktop of a client according to an embodiment of the invention.

To illustrate an embodiment of the invention, consider FIG. 2, which is an illustration of exemplary desktop of client 100 according to an embodiment. As shown in FIG. 2, process 204 is responsible for rendering desktop 206 on a physical display of client 100. Process 214A runs in untrusted VM 214 and does not have complete access to the file system of client 100. When process 214A running inside VM 214 requests access to the file system of client 100, the request is intercepted and handled by VM0 230. For example, process 202 may be responsible for rendering a window 208 depicting the contents of the file system of client 100. Process 202 has the option of selectively determining which contents are available to VM 214 based on policies as set forth by the IT administrator or the user. Process 214A may generate the contents of a display window 224 to be shown on desktop 206 based on the information made available to it by processes 202.

VM 210 in FIG. 2 that runs the solitaire game shown in display window 220 is implemented such that the display of VM 210 is a virtualized display, which is then composed into the desktop 206 (as appropriate) by controlling process 204 running in VM0 130. Display windows 222 and 224, which depict content generated by processes running in VMs 212 and 214 respectively, are rendered on the desktop 206 in a similar fashion.

The Legacy Virtual Machine—LVM

FIG. 1A depicts a legacy virtual machine (LVM) 140 according to an embodiment of the invention. LVM 140 serves as the primary entity being managed by the IT administrator of client 100. As such, LVM 140 provides an environment that is analogous to the managed enterprise OS of corporate computer system in that an IT department may install and maintain various enterprise applications within operating system 144 of LVM 140. Certain embodiments may not comprise a LVM 140, and as a result, the presence of LVM 140 is optional within embodiments of the invention.

LVM 140 may contain operating system 144. In an embodiment, operating system 144 of LVM 140 may correspond to a Microsoft Windows OS or any other general purpose OS such as Linux or MacOS. In an embodiment, LVM 140 is responsible for storing the main file system 142 of client 100 (although other embodiments may store file systems elsewhere). File system 142 may contain the user's profile folder containing the user's settings and files. LVM 140 typically only runs infrastructure OS programs and programs that are used for the purpose of managing client 100 and trusted enterprise applications. Other user programs (especially those that involve external components or consume untrusted data) do not run in LVM 140, but instead, run elsewhere in separate VMs (such as a UCVM as described in more detail below).

In an embodiment, the network access of LVM 140 is restricted to just the corporate network as implemented by firewall VM 150. Firewall VM 150 is a specialized virtual machine that comprises firewall software/applications to restrict network access of VMs running in client 100 to appropriate and/or necessary network access points. Such practice is consistent with the need for only the responsible IT administrator to be capable of connecting to LVM 140 to manage LVM 140 and processes executing therein.

In one embodiment, LVM 140 and VM0 130 may be implemented in a single virtual machine.

Untrusted Code Virtual Machine—UCVM

In an embodiment, when a user wishes to run any application that requires access to either a network or untrusted data (untrusted data is any data that originates from outside client 100), the application is run inside a dedicated VM that is created on-demand by hypervisor 120. This dedicated VM is called an Untrusted Code Virtual Machine (or "UCVM"). FIG. 1A depicts several UCVMs, namely UCVM 160, 162, 164, and 166. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of virtual machine having desired characteristics and (b) providing access to a restricted file system to the newly created UCVM. For example, UCVM 160 comprises restricted file system 160A, UCVM 162 comprises restricted file system 162A, and UCVM 164 comprises restricted file system 164A. Each UCVM possesses its own instance or copy of the operating system, which is isolated and separate from the main operating system (including its code and data) executing within VM0 130 or LVM 140. For example, UCVM 160 comprises operating system 160B, UCVM 162 comprises operating system 162B, and UCVM 164 comprises operating system 164B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 138 stored in VM0 130. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Module 136 is software that is responsible for implementing the rules and policies of embodiments as well as helping the user of client 100 in understanding and navigating the security model employed by client 100 on an as-needed basis. Module 136 helps decide what activities run in which UCVMs, including when VMs are created or destroyed, and what kind of access to network and file system resources each UCVM has. Module 136 also helps protect the user, e.g., when a user is fooled by malware running in a UCVM and is in the process of providing some information that they have previously provided to enterprise code running in LVM 140 (for example a password), then module 136 may detect this situation and prevent the user from providing the information (which may be secret corporate information) to the malware.

Regarding the restricted file system of each UCVM, each UCVM has access to a private copy of a subset of the files in file system 142 on client 100. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 160 as an example, if a process executing within UCVM 160 makes any changes to any files in restricted file system 160A, then these changes do not impact the files stored in file system 142 maintained in LVM 140 because such changes are only made to restricted file system 160A maintained in the UCVM and are not propagated, without express consent from the user, to file system 142 maintained by LVM 140.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse effects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, module 136 of VM0 130 may dynamically create the UCVM using a template selected from one or more templates 138 or use a pre-existing template in memory or on the disk. The template selected by module 136 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab displays a different web page. In consideration of the code which may be contained or embedded on a web page, each web page may be properly considered a web application. In embodiments of the invention, the code responsible for rendering the user interface (UI) of the web browser runs in VM0 130. On the other hand, executable code for the three web applications runs in three separate UCVMs. A core HTML/Javascript engine runs in each of the three UCVMs. Each of the three separate UCVMs also may have characteristics selected or optimized for web browsing. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 100 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 100.

Firewall Virtual Machine

In an embodiment, the implementation of the network access restrictions may be performed done in a dedicated VM called a firewall VM. FIG. 1A depicts an exemplary firewall VM 150 of an embodiment. Firewall VM 150 runs an isolated operating system with a dedicated and fixed set of firewall applications that implement the network access policy for all VMs in client 100 (except perhaps VM0 130, which may not have any network access). Firewall VM 150 may provide, to any virtual machine running on client 100 in which untrusted code is executed or untrusted data is being interpreted, restricted access to only those network resources deemed necessary on an as-needed basis in accordance with a policy described by policy data stored on client 100.

In another embodiment of the invention, the firewall functionality of the system may be co-located and implemented inside either the hypervisor 120 of FIG. 1A, or inside the LVM 140 of FIG. 1A (working in conjunction with the hypervisor 120 of FIG. 1A), or inside VM0 130 of FIG. 1A (working in conjunction with the hypervisor 120 of FIG. 1A).

Validated Virtual Machines—VVMs

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 1A depicts an exemplary VVM 166 of an embodiment. Note that while FIG. 1A depicts a single VVM for ease of explanation, other embodiments of the invention may employ two or more VVMs or no VVMs based upon the particular needs of the user and/or policies of the organization responsible for or the owner of client 100.

Applications need to be signed and configured for co-location in the same VM by an administrator of client 100 before they can run in VVM 166. Inside VVM 166, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 142 exposed to a VVM is similar to that exposed to a generic UCVM in that the restricted copy of file system 142 exposed to a VVM comprises only those files related to, or required for, performance of the applications executing within the VVM.

The Restricted File System Exposed to a VM

Figure 3:
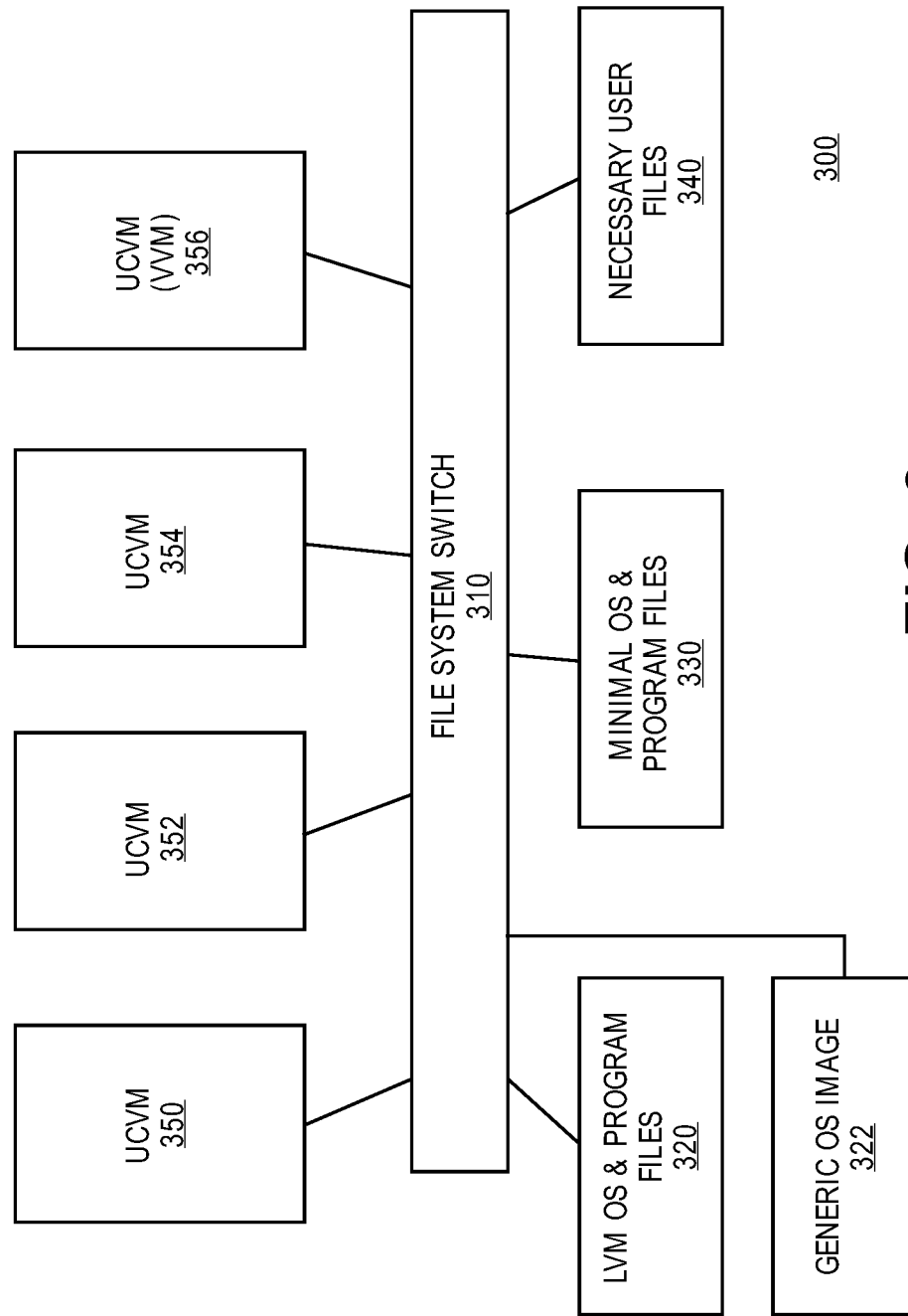
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 142 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 142. The composition of necessary user files 340 will be different for each user. The set of files comprising the user files in file system 142 maintained in LVM 140 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 140 maintained in LVM 140, then necessary user files 340 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 142 for another file from within the application (for example, by using the File->Open menu item of MS Word), then he or she will see a restricted user files directory.

Figure 4:
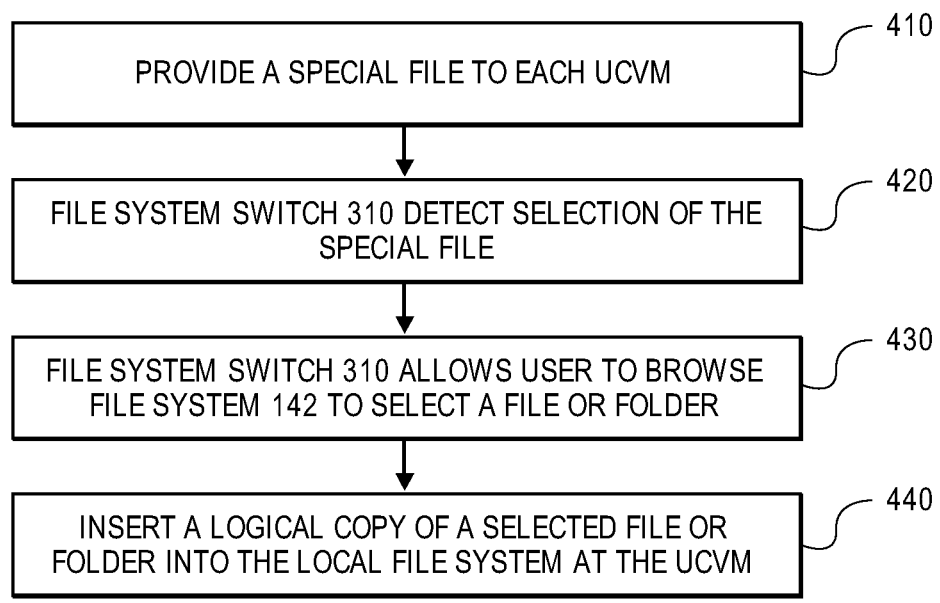
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 142 maintained in LVM 140 using an application executing within an UCVM, a user interface may be provided to allow the user to browse his or her files in file system 142, select one or more of the user files, and expose a copy of the selected files to the appropriate UCVM. FIG. 4 is a flowchart illustrating the steps involved in a UCVM obtaining a copy of a new user file maintained in file system 142 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 142 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 140 that allows the user to browse the full file system 142 maintained in LVM 140. The user may then select a file or folder in file system 142. Note that at this stage, the user may be granted read access to the full file system 142 for purposes of selecting a file or folder, but the user is not granted write access to file system 142. Therefore, the user is prevented from modifying file system 142 maintained by LVM 140 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 142 maintained by LVM 140.

The steps of FIG. 4 ensure that files in file system 142 maintained by LVM 140 are not visible to a UCVM without explicit permission from the user. Malicious code running in a UCVM, for example, cannot programmatically access files in file system 142 in LVM 140. Further, malicious code running in a UCVM also cannot render a false user interface to trick the user into unintentionally providing any user files to the malicious code, since all code responsible for rendering the user interface is maintained within VM0 130, and thus, unreachable by the malicious code.

File System Switch 310 may be implemented in a variety of ways. For example, in one embodiment, File System Switch 310 may be implemented by a network file system protocol (NFS or CIFS may be used). A special VM (or LVM 140) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 130.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 140.

Cloning a UCVM from a Template

In an embodiment of the invention, a virtual machine created in client 120 is instantiated using a template selected from one or more templates 138 stored in VM0 130. In an embodiment, each template in one or more templates is either immutable or updatable in a very controlled fashion.

Each of one or more templates 138 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 100 or externally connected to client 100 may interact with one or more processes executing in a virtual machine within client 100. In an embodiment, a template may assign responsibility for a selected set of devices to a virtual machine created using the template. In other embodiments, responsibility for a selected set of devices may be assigned to a particular virtual machine by virtue of policy data stored on client 100. Such policy data may describe one or more policies provided to client 100 from an owner or responsible organization of client 100. Policy data of this nature may be maintained by VM0 130 or LVM 140, for example, in certain embodiments.

In an embodiment, one or more templates 138 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited for, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Restricting Network Access to a Guest Operating System

It is desirable in some circumstances to provide network access to one or more virtual machines executing on a device without providing access to the host operating system of that device. As mentioned above, virtual machines executing on client 100 may be instantiated for purposes of executing untrusted code or accessing untrusted data. The host operating system, on the other hand, is typically responsible for managing trusted resources; consequently, it is important to ensure the privacy and integrity of the host operating system. To do so, it is necessary to prevent any malicious code inadvertently introduced into the host operating system from sending information about any resources of the host operating system to a recipient over an untrusted network. As such, it is desirable to deny the host operating system access to untrusted networks while permitting guest operating systems to do so. That is not to say that the host operating system should be denied access to all networks in every implementation. In point of fact, the host operating system may have access to a completely different set of network resources than those provided to guest operating systems executing on client 100, e.g., a host operating system may have access to a secure network (such as a corporate Intranet) or may not have any have network access at all.

Advantageously, techniques will be presented herein which allow guest operating systems to have access to an untrusted network, such as the Internet, while preventing a host operating system executing on the same device from doing so. In this way, any malicious code that is inadvertently introduced into the host operating system will be prevented from accessing any unsecured or untrustworthy networks for unscrupulous purposes.

Certain embodiments of the invention employ a type 1.5 hypervisor, which is discussed in detail above in the section entitled "Type 1.5 Hypervisors." A type 1.5 hypervisor instantiates virtual machines at a higher priority than the host operating system. As a result, the host operating system cannot read data stored by a guest operating system executing within an instantiated virtual machine because it lacks sufficient privilege to do so.

To access any network resource on an untrusted network, a guest operating system may need to authenticate itself to a network device responsible for managing access to the untrusted network. To that end, a guest operating system might store authentication data used to generate an authentication credential for authenticating any network access request originating from the guest operating system. Such authentication data could be provided to the guest operating system upon instantiation of the virtual machine in which it executes. If the guest operating system is executed within a virtual machine instantiated by a type 1.5 hypervisor, then the host operating system would not be able to read the authentication data stored by the guest operating system. This approach would prevent any malicious code inadvertently introduced into the host operating system from reading the authentication data directly from the guest operating system and subsequently using the authentication data to gain access to an untrusted network.

However, if malicious code were present within the guest operating system, then a process executing in the guest operating system could make the authentication data known to nefarious parties responsible for malicious code by publishing the authentication data on an untrusted network or by sending the authentication data to a party in an email attachment or the like. Either way, if the authentication data were to become known to others, then the possibility exists that malicious code, in possession of the authentication data, could be introduced into the host operating system. In this unfortunate circumstance, the malicious code in the host operating system may be able to successfully authenticate itself to the network device as it is in possession of the authentication data, which would put the privacy and integrity of the host operating system at risk.

Consequently, as shall be explained in detail below, in embodiments of the invention, rather than storing authentication data within the guest operating system issuing the network access request, authentication data may be stored in the hypervisor. The hypervisor works in conjunction with guest operating systems so that processes executing in guest operating systems or the host operating system will be unable to authenticate themselves without the involvement and consent of the hypervisor.

Figure 5:
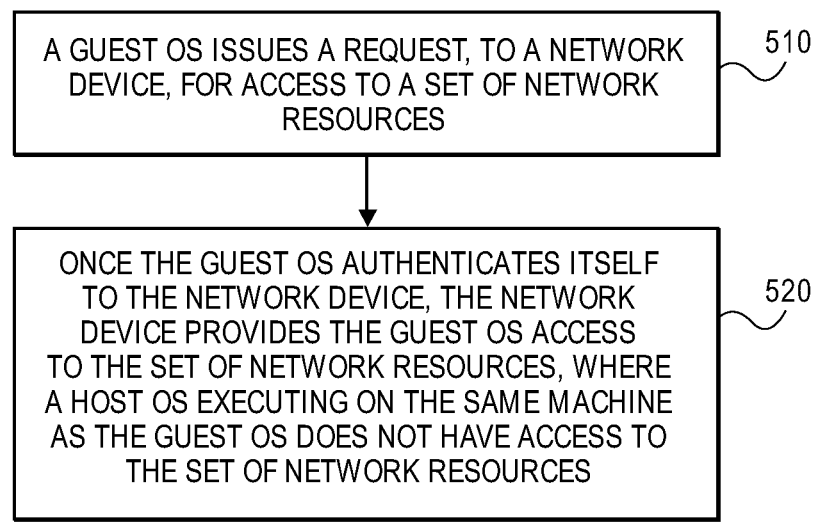
FIG. 5 is a flowchart illustrating the functional steps of restricting network access to one or more virtual machines according to an embodiment of the invention.

FIG. 5 is a flowchart illustrating the functional steps of restricting network access to one or more virtual machines according to an embodiment of the invention. The steps of FIG. 5 will be discussed below with reference to FIG. 6, which is a block diagram of a system 600 according to an embodiment of the invention. Before describing the steps of FIG. 5 in detail, it will be helpful to appreciate the components of system 600.

System 600 includes computer 610, communications link 630, secure network 640, network device 650, untrusted network 660, and network resources 670. Computer 610 is intended to broadly represent any type of machine capable of executing host operating system 616 and hypervisor 612. Examples of computer 610 include client 100 depicted in FIG. 1 and computer system 700 explained below with reference to FIG. 7. Computer 610 comprises hypervisor 612, virtual machine container 614 in which host operating system 616 executes, and one or more virtual machines (such as virtual machines 620 and 626) in which guest operating systems (such as guest operating systems 622 and 628 respectively) execute.

Figure 6:
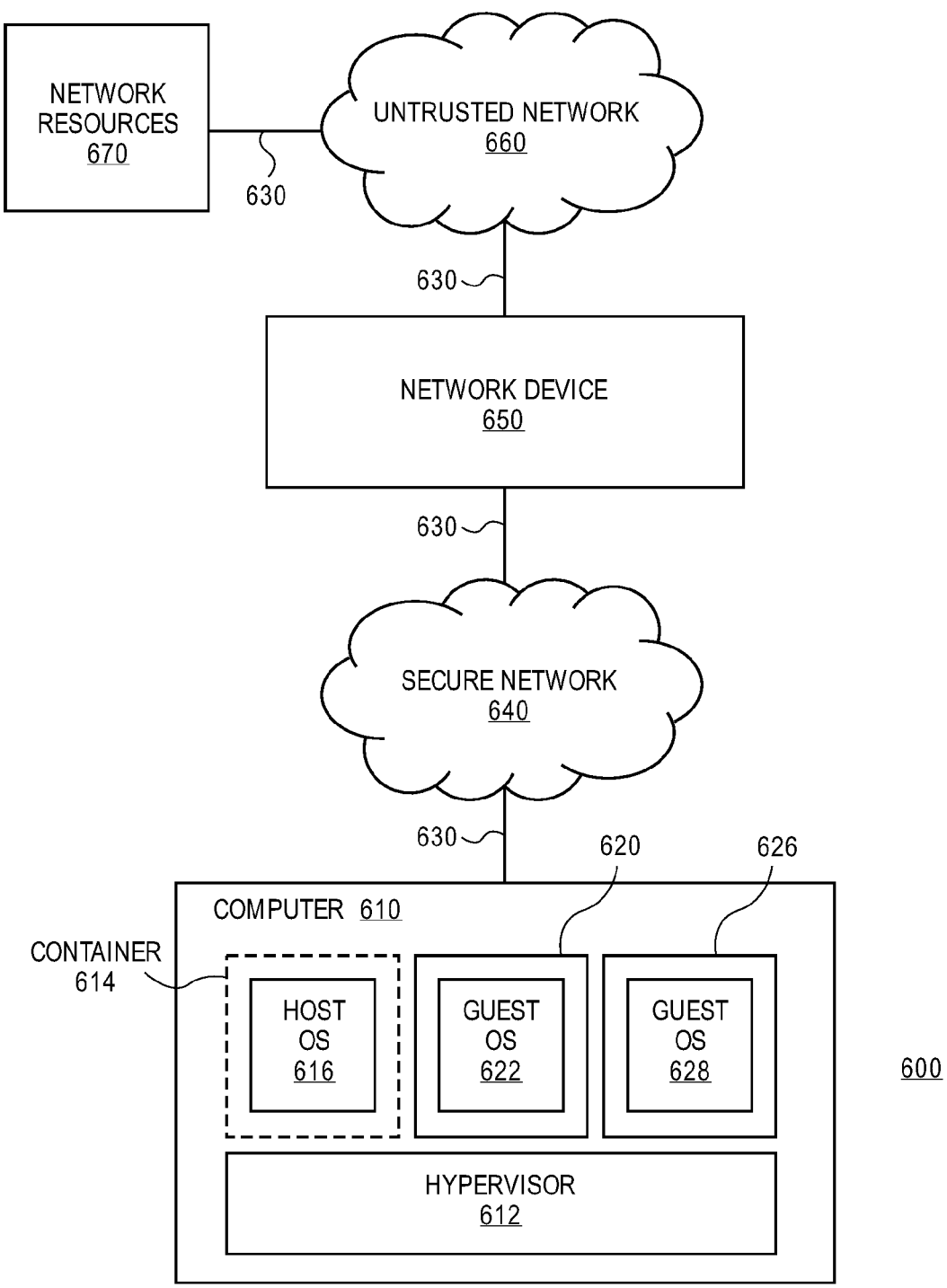
FIG. 6 is a block diagram of a system according to an embodiment of the invention.

While two virtual machines are depicted executing on computer 610 in FIG. 6, hypervisor 612 may instantiate or deinstantiate any number of virtual machines on computer 610. In an embodiment, hypervisor 612 is a Type 1.5 hypervisor which is described above with reference to FIG. 1B. Similarly, container 614 may operate similar to container 184 described above with reference to FIG. 1B.

Turning to the other components shown in FIG. 6, communications link 630 may be implemented by any medium or mechanism that provides for the exchange of data between components of system 600. Non-limiting, illustrative examples of communications link 630 include, without limitation, a network such as a Local Area Network (LAN), Wide Area Network (WAN), Ethernet or the Internet, one or more terrestrial, satellite or wireless links, and physical cables. Communications link 630 will typically be implemented as a secure communication channel. In an embodiment, data may be exchanged between computer 610 and network device 650 over a secure network 640, such as an Intranet or corporate network.

Secure network 640 is intended to broadly represent any type of network in which a party must authenticate themselves to the network to join. Note that secure network 640, while depicted in FIG. 6, is optional, as in certain embodiments computer 610 may communicate with network device 650 over communications link 630 without traversing a network. While not depicted on FIG. 6 for clarity, host operating system 616 may have access to secure network 640.

Network device 650 may be embodied by any device which is capable of communicating with a set of one or more computers (not depicted in FIG. 6 but which includes computer 610) and assume responsibility for managing the ability for the one or more computers to access untrusted network 660, and by extension, network resources 670. Non-limiting, illustrative examples of network device 650 include a HTTP proxy, a virtual private network (VPN) endpoint, a network switch, and the like. While network device 650 is depicted as a separate entity in FIG. 6, in certain embodiments, network device 650 may be implemented on the same physical device as computer 610.

Untrusted network 660 is intended to represent any network capable of storing untrustworthy data and/or code, such as the Internet. The steps of FIG. 5 will illustrate how a guest operating system executing on computer 610 may be provided access to untrusted network 660 while ensuring host operating system 616 lacks access to untrusted network 660. Network resources 670 are broadly intended to represent one or more resources available over untrusted network 660, such as a file, a web page, interpreted data, and executable code.

The flowchart of FIG. 5 shows the steps of allowing a guest operating system, but not the host operating system, access to untrusted network 660. FIG. 5 will be explained below in an example involving guest operating system 622 accessing network resources 670 over untrusted network 660 in a manner that prevents host operating system 616 from accessing untrusted network 660.

As depicted in step 510 of FIG. 5, initially a request to access network resources 670 over untrusted network 660, issued on behalf of guest operating system 622, is sent from computer 610 to network device 660. The request of step 510 will typically be communicated over a secure session from computer 610 to network device 650 over secure network 640.

The issuance of the request of step 510 may be performed by hypervisor 612 in conjunction with guest operating system 622. For example, hypervisor 612 may either determine, on its own, that guest operating system 622 requires access to network resources 670 or be notified by guest operating system 622 that guest operating system 622 requires access to network resources 670.

Thereafter, upon knowledge that guest operating system 622 requires access to network resources 670, hypervisor 612 uses authentication data to compute authentication credentials used by network device 650 to authenticate the request for network resources 670. Authentication data, as used herein, refers to any mechanism for generating an authentication credential. Non-limiting, illustrative examples of authentication data include a private key or a shared secret such as a password. As used herein, "authentication credentials" refers to any data for use in authenticating a request for network resources 670. As the authentication data is stored by hypervisor 612, neither host operating system 616 nor any virtual machine instantiated by hypervisor 612 has sufficient privilege to access the private key.

Instead of storing authentication data within hypervisor 612, in an embodiment, authentication data may be stored in another virtual machine, such as virtual machine 626 or a special virtual machine specifically tailored to be responsible for network access, such as firewall VM 150. Note that host operating system 616 cannot read the authentication data stored by guest operating system 628 within the other virtual machine storing the authentication data (such as virtual machine 626 or firewall VM 150) because the virtual machine would be executing at a higher privilege than host operating system 616.

In step 520, once guest operating system 622 authenticates itself to network device 650, network device 650 provides guest operating system 622 access to untrusted network 660 to permit retrieval of network resources 670. For example, network device 650 may provide guest operating system 622 access to untrusted network 660 by establishing a session key for a session, administered by network device 650, for accessing untrusted network 660. Note that host operating system 616 has not been provided access to untrusted network 660 by network device 650.

Using HTTP Headers to Authenticate Guests to the Network Device

In one embodiment, the request of step 510 may be embodied as a Hypertext Transfer Protocol (HTTP) request. In such an embodiment, network device 650 may correspond to a HTTP proxy (for ease of explanation, network device 650 shall be referred to as HTTP proxy 650 in this section). The purpose of the HTTP proxy is to treat network requests from guest operating systems differently than those from host operating system 616. Guest operating systems may connect to network proxy 650 to gain access to resources of untrusted network 660. Guest operating systems authenticate themselves to network proxy 650 using an authentication credential known to the guest operating system but not host operating system 616.

The request of step 510 of FIG. 5 may correspond to a HTTP request. The HTTP header of the HTTP request may contain an authentication token to which host operating system 616 lacks access. Using the authenticated token contained in the HTTP header, network device 650 may authenticate the request of 510 sent by computer 610 on behalf of guest operating system 622. Once network device 650 authenticates guest operating system 622, network device 650 may provide guest operating system 622 access to untrusted network 660 to allow retrieval of network resources 670.

Hardware Mechanisms

Figure 7:
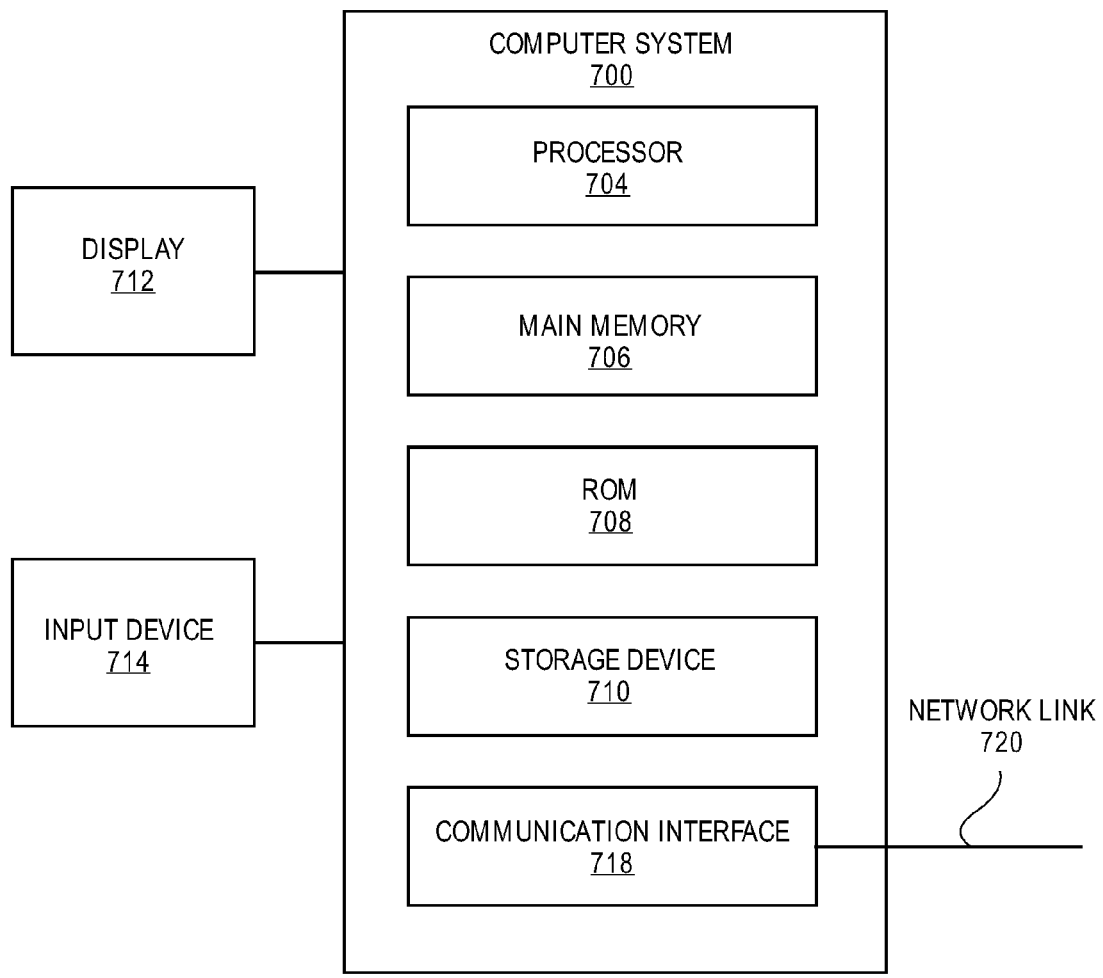
FIG. 7 is a block diagram that illustrates a computer system upon which an embodiment of the invention may be implemented.

In an embodiment, client 100 of FIG. 1 may be implemented on a computer system. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for providing operating environments selective access to network resources, which when executed by one or more processors, causes:
   a guest operating system, executing on a device, issuing a request to a network device for access to a set of network resources, wherein a host operating system executes on said device; and
   upon the guest operating system authenticating itself to the network device using authentication data, the network device providing, to the guest operating system, access to the set of network resources,
   wherein said host operating system executing on the device does not have access to said set of network resources for lack of a sufficient privilege based on data contained in Extended Page Tables (EPT) of said host operating system, and wherein said host operating system executing on the device does not have sufficient privilege to access said authentication data based on the data contained in the Extended Page Tables (EPT) of said host operating system.

2. The non-transitory computer-readable storage medium of claim 1, wherein the authentication data is stored in the guest operating system.

3. The non-transitory computer-readable storage medium of claim 1, wherein the authentication data is stored by the hypervisor or in a different virtual machine than in which the guest operating system executes.

4. The non-transitory computer-readable storage medium of claim 1, wherein execution of the one or more sequences of instructions further cause:
upon a hypervisor determining that the guest operating system requires access to the set of network resources, the hypervisor or a special virtual machine computing authentication credentials and inserting the authentication credentials into the request sent to the network device.

5. The non-transitory computer-readable storage medium of claim 4, wherein the authentication data, used to compute the authentication credentials, is stored in the special virtual machine.

6. The non-transitory computer-readable storage medium of claim 1, wherein execution of the one or more sequences of instructions further cause:
upon the guest operating system notifying a hypervisor or a special virtual machine that the guest operating system requires access to the set of network resources, the hypervisor or the special virtual machine computing authentication credentials that are provided to the guest operating system for transmittal to the network device.

7. The non-transitory computer-readable storage medium of claim 1, wherein the host operating system cannot read the authentication data stored by the guest operating system because a virtual machine in which the guest operating system runs is protected from the host operating system due to the host operating system being deprivileged.

8. The non-transitory computer-readable storage medium of claim 1, wherein the host operating system has access to an Intranet but not the Internet.

9. The non-transitory computer-readable storage medium of claim 1, wherein the guest operating system communicates with the network device over a secure session.

10. The non-transitory computer-readable storage medium of claim 1, wherein the host operating system cannot read the authentication data stored by the guest operating system.

11. An apparatus for providing operating environments selective access to network resources, comprising:
one or more processors; and
one or more non-transitory computer-readable storage mediums storing one or more sequences of instructions, which when executed, cause:
a guest operating system, executing on a device, issuing a request to a network device for access to a set of network resources, wherein a host operating system executes on said device; and
upon the guest operating system authenticating itself to the network device using authentication data, the network device providing, to the guest operating system, access to the set of network resources,
wherein said host operating system executing on the device does not have access to said set of network resources for lack of a sufficient privilege based on data contained in Extended Page Tables (EPT) of said host operating system, and wherein said host operating system executing on the device does not have sufficient privilege to access to said authentication data based on the data contained in the Extended Page Tables (EPT) of said host operating system.

12. The apparatus of claim 11, wherein the authentication data is stored in the guest operating system.

13. The apparatus of claim 11, wherein the authentication data is stored by the hypervisor or in a different virtual machine than in which the guest operating system executes.

14. The apparatus of claim 11, wherein execution of the one or more sequences of instructions further cause:
upon a hypervisor determining that the guest operating system requires access to the set of network resources, the hypervisor or a special virtual machine computing authentication credentials and inserting the authentication credentials into the request sent to the network device.

15. The apparatus of claim 14, wherein the authentication data, used to compute the authentication credentials, is stored in the special virtual machine.

16. The apparatus of claim 11, wherein execution of the one or more sequences of instructions further cause:
upon the guest operating system notifying a hypervisor or a special virtual machine that the guest operating system requires access to the set of network resources, the hypervisor or the special virtual machine computing authentication credentials that are provided to the guest operating system for transmittal to the network device.

17. The apparatus of claim 11, wherein the host operating system cannot read the authentication data stored by the guest operating system because a virtual machine in which the guest operating system runs is protected from the host operating system due to the host operating system being deprivileged.

18. The apparatus of claim 11, wherein the host operating system has access to an Intranet but not the Internet.

19. The apparatus of claim 11, wherein the guest operating system communicates with the network device over a secure session.

20. A method for providing operating environments selective access to network resources, comprising:
a guest operating system, executing on a device, issuing a request to a network device for access to a set of network resources, wherein a host operating system executes on said device; and
upon the guest operating system authenticating itself to the network device using authentication data, the network device providing, to the guest operating system, access to the set of network resources,
wherein said host operating system executing on the device does not have access to said set of network resources for lack of a sufficient privilege based on data contained in Extended Page Tables (EPT) of said host operating system, and wherein said host operating system executing on the device does not have sufficient privilege to access to said authentication data based on the data contained in the Extended Page Tables (EPT) of said host operating system.

* * * * *